(No Model.)
F. H. HARRIS.
TOY.
No. 459,580. Patented Sept. 15, 1891.
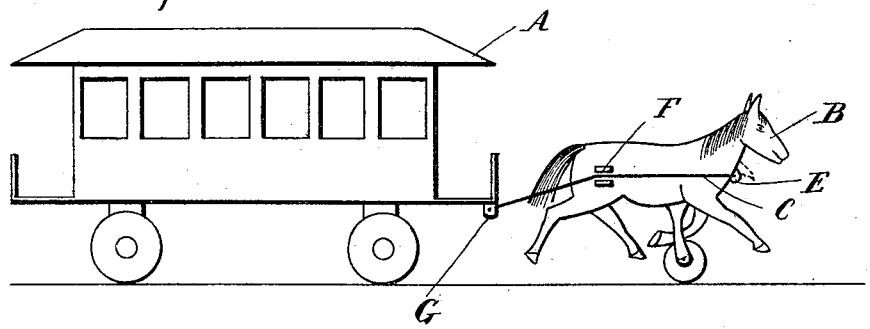
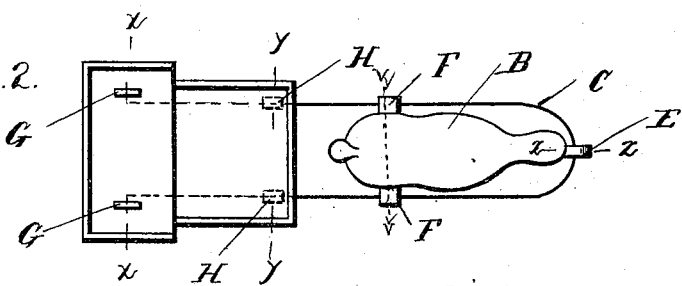
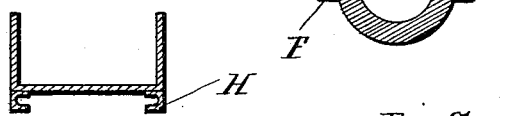
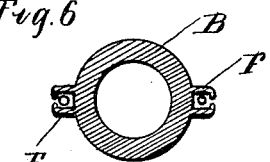
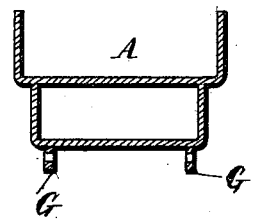
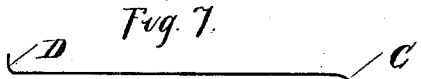
Witnesses
M. B. O'Dogherty
P. M. Hulbert
Inventor
Frank H. Harris
By Thos. S. Sprague & Son
Att'y.
THE NORRIS PETERS CO., PHOTO-LITHO., WASHINGTON, D. C.

UNITED STATES PATENT OFFICE.

FRANK H. HARRIS, OF TOLEDO, OHIO.

TOY.

SPECIFICATION forming part of Letters Patent No. 459,580, dated September 15, 1891.

Application filed December 26, 1890. Serial No. 375,912. (No model.)

*To all whom it may concern:*

Be it known that I, FRANK H. HARRIS, a citizen of the United States, residing at Toledo, in the county of Lucas and State of Ohio, have invented certain new and useful Improvements in Toys, of which the following is a specification, reference being had therein to the accompanying drawings.

This invention relates specifically to improved means for harnessing or attaching animals to wheeled toys or vehicles of all kinds, as more fully hereinafter described.

In the accompanying drawings, Figure 1 is an elevation of a toy street-car, showing my improved means for attaching a horse thereto. Fig. 2 is a plan of a toy cart with my improvement. Fig. 3 is a section on line $x\ x$ in Fig. 2. Fig. 4 is a section on line $y\ y$ in Fig. 2. Fig. 5 is a section on line $z\ z$ in Fig. 2. Fig. 6 is a section on line $v\ v$ in Fig. 2, and Fig. 7 is a plan view of the trace detached.

A represents a toy street-car or any other toy mounted on wheels.

B represents a toy horse or other animal for drawing the toy, and C represents the traces by means of which the animal is hitched to the toy. These traces I make of one piece of spring-wire bent in the form of a loop with parallel legs and provided at the ends with bends or hooks D, preferably projecting outwardly at right angles. These traces are secured to the animal by means of a staple cast into the breast, or, preferably, by means of a lug E, cast or formed integral with the body of the animal and of suitable form to be readily clinched over the traces, as shown in Fig. 5, to the sides of the animal. I preferably secure horizontal grooved guides F, which, if possible, I form by casting them integral with the body of the animal, as shown in cross-section in Fig. 6, and, if desired, they may also be clinched upon the traces, which they hold between them. The hooks at the rear ends of the traces are attached to the toy by engaging them into suitable eyes G, formed on the outside of the vehicle or in any other desired relation thereto.

The parts being thus constructed and arranged as described, it will be readily seen that my device is especially adapted for the construction of cheap toys and by the readiness and simplicity with which the animal can be detached and attached to the toy forms a source of pleasure for the children, the detaching being done by simply pressing the two legs of the loop together near their point of attachment to the toy, when they will readily disengage from the eyes. In attaching to two-wheeled vehicles I place the eyes G under the rear end of the body, as shown in Fig. 2, and support the front end of the toy upon the traces, forming suitable guide-legs H on the under side thereof, into which the traces may be engaged and by means of which the forward end of the toy may be securely supported upon or connected to the traces themselves.

My improved means for attaching animals to wheeled toys is especially simple and inexpensive in the manufacture of cast-metal toys.

What I claim as my invention is—

1. The combination of a wheeled toy provided with the eyes G, the toy animal provided with a pair of traces C, formed of a single piece of spring-wire and having the hooked ends D, and the fastenings F and E, by means of which the traces are secured to the body of the animal, substantially as described.

2. As a new article of manufacture in toys, a metallic wheeled toy provided with the eyes G, integrally formed therewith, the animal B, cast of metal integral with the lugs F and E upon the sides and breast of the animal, respectively, and the traces C of a single piece of spring-wire, with the hooks D, substantially as and for the purpose described.

In testimony whereof I affix my signature in presence of two witnesses.

FRANK H. HARRIS.

Witnesses:
L. G. RICHARDSON,
EDW. S. BARKDULL.